United States Patent [19]

Williams

[11] Patent Number: 4,680,370

[45] Date of Patent: Jul. 14, 1987

[54] BRANCHED POLYCARBONATE COMPOSITION FROM TRIS(HYDROXYARYL)PHOSPHORUS COMPOUND

[75] Inventor: Janet C. Williams, Midland, Mich.

[73] Assignee: The Dow Chemical Company, Midland, Mich.

[21] Appl. No.: 781,162

[22] Filed: Sep. 30, 1985

[51] Int. Cl.$^4$ .................. C08G 63/62; C08G 79/04
[52] U.S. Cl. .................. 528/167; 528/169; 528/204
[58] Field of Search .................. 528/167, 169

[56] References Cited

U.S. PATENT DOCUMENTS

| | | | |
|---|---|---|---|
| 2,950,266 | 8/1960 | Goldblum | 260/43 |
| 3,014,891 | 12/1961 | Goldblum | 260/47 |
| 3,220,973 | 11/1965 | Goldberg | 260/47 |
| 3,442,982 | 5/1969 | Friedman | 260/927 |
| 3,525,712 | 8/1970 | Kramer | 260/47 |
| 3,541,049 | 11/1970 | Cleveland | 260/47 |
| 3,635,895 | 1/1972 | Kramer | 260/47 XA |
| 3,799,953 | 3/1974 | Freitag | 260/395 |
| 3,816,373 | 6/1974 | Hoogeboom | 260/47 XA |
| 3,875,112 | 4/1975 | Bockmann | 260/47 XA |
| 3,894,991 | 7/1975 | Neuray | 260/47 XA |
| 3,897,392 | 7/1975 | Haupt | 260/47 XA |
| 3,931,108 | 1/1976 | Binsack | 260/47 XA |
| 3,957,728 | 5/1976 | Neuray | 260/47 XA |
| 3,992,357 | 11/1976 | Constien | 260/47 XA |
| 4,001,183 | 1/1977 | Freitag | 260/47 XA |
| 4,001,184 | 1/1977 | Scott | 260/47 XA |
| 4,048,200 | 9/1977 | Tresper | 260/395 |
| 4,059,565 | 11/1977 | Yoshizaki | 260/47 XA |
| 4,087,408 | 5/1978 | Moedritzer | 528/169 |
| 4,130,548 | 12/1978 | Kochanowski | 528/197 |
| 4,168,368 | 9/1979 | Chumbley | 528/204 |
| 4,174,437 | 11/1979 | Idel | 528/199 |
| 4,185,009 | 1/1980 | Idel | 260/45.9 R |
| 4,201,720 | 5/1980 | Passagne | 260/463 |
| 4,277,600 | 7/1981 | Mark | 528/204 |
| 4,294,953 | 10/1981 | Quinn | 528/128 |
| 4,307,221 | 12/1981 | Poisson | 528/167 |
| 4,415,722 | 11/1983 | Mark | 528/196 |
| 4,415,723 | 11/1983 | Hedges | 528/204 |
| 4,415,724 | 11/1983 | Mark | 528/204 |
| 4,415,725 | 11/1983 | Hedges | 528/204 |
| 4,419,299 | 12/1983 | Hefner | 260/929 |
| 4,435,544 | 3/1984 | Schreckenberg | 525/146 |
| 4,436,879 | 3/1985 | Miller et al. | 525/439 |
| 4,446,298 | 5/1984 | Mark | 528/204 |
| 4,452,966 | 6/1984 | Matsuo | 528/174 |
| 4,463,159 | 7/1984 | Besecke et al. | 528/169 |
| 4,469,860 | 9/1984 | Rosenquist | 528/196 |
| 4,469,861 | 9/1984 | Mark | 528/196 |
| 4,474,999 | 10/1984 | Mark et al. | 568/720 |
| 4,514,334 | 4/1985 | Mark | 260/395 |
| 4,521,562 | 6/1985 | Rosenquist | 524/490 |
| 4,556,698 | 12/1985 | Braksmayer | 528/169 |

*Primary Examiner*—Harold D. Anderson
*Attorney, Agent, or Firm*—B. G. Colley

[57] ABSTRACT

Polycarbonate compositions are formed by reaction of aromatic trihydroxy phosphorus compounds to induce random-chain branching.

14 Claims, No Drawings

BRANCHED POLYCARBONATE COMPOSITION FROM TRIS(HYDROXYARYL)PHOSPHORUS COMPOUND

BACKGROUND OF THE INVENTION

I. Field of the Invention

This invention relates to novel polycarbonate compositions formed by the reaction of aromatic trihydroxy phosphorus compounds to induce random-chain branching.

II. Description of the Prior Art

Branched-chain high-molecular weight thermoplastic polycarbonates containing the residues of monohydric phenols and polyhydric phenols having more than two hydroxy groups in the molecule are disclosed in U.S. Pat. No. 3,544,514 and its reissue U.S. Pat. No. Re. 27,682.

Other patents disclose polyphenolic compounds having utility as branching agents in the production of randomly-branched polycarbonates such as U.S. Pat. Nos. 3,094,508 and 4,426,513, however, none of these patents disclose the trihydroxy phosphorus compounds as branching agents of the present invention.

Polycarbonates having the phosphorus element in the backbone of the polymer are illustrated by U.S. Pat. No. 4,444,978. These polycarbonates have increased thermal stability. Other phosphorus-modified polycarbonate resins are disclosed in U.S. Pat. No. 4,474,937. Likewise, U.S. Pat. Nos. 4,322,520; 4,381,390; 4,481,350 and 4,508,890 each disclose phosphorus-modified polycarbonates. However, none disclose the trifunctional aspect of the present invention which provides the random branching.

U.S. Pat. No. 3,597,394 discloses that polycarbonates are branched or crosslinked by the addition of the cyclic trimer of phosphonitrilic chloride.

SUMMARY OF THE INVENTION

The present invention is directed to novel polycarbonate compositions which are formed by the reaction of aromatic trihydroxy phosphorus compounds. In its more specific aspects, the present invention is directed to those new compositions of matter which involve the reaction of the aromatic trihydroxy phosphine.

DETAILED DESCRIPTION

The polycarbonate compositions of matter of the present invention are the reaction products of an aromatic trihydroxy phosphorus compounds having the following general formulae:

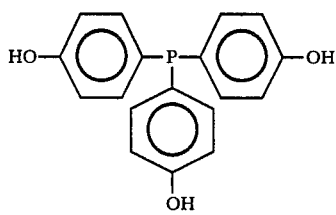
(1)

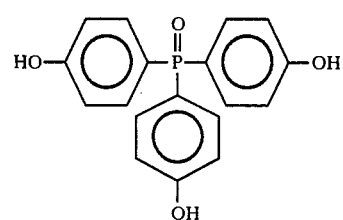
(2)

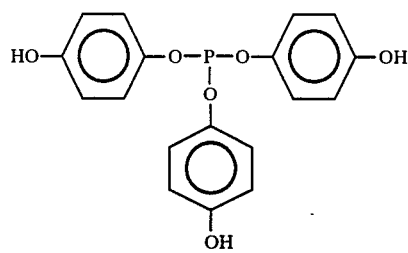
(3)

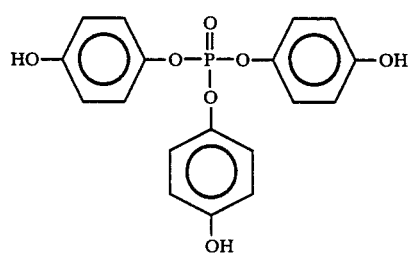
(4)

Each of the aromatic rings,

has a structure

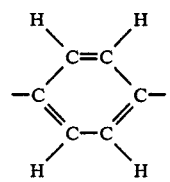

or may be substituted in place of the hydrogen with a $C_1$ to $C_4$ alkyl, chlorine, bromine or a mixture thereof. The phosphorus compounds which induce random-chain branching according to the present invention are the tri(p-hydroxyphenyl)phosphines (formula 1), the tri(p-hydroxyphenyl)phosphine oxides (formula 2), the tri(p-hydroxyphenyl)phosphites (formula 3) and the tri(p-hydroxyphenyl)phosphates (formula 4).

The preferred reactants include a trifunctional phosphine, a material having the formula (1) above and more specifically tri-(p-hydroxyphenyl)phosphine as the branching agent with a dihydric phenol, a monohydric phenol and a carbonyl halide. The reaction is carried out by mixing the dihydric phenol, the monohydric phenol and one or a mixture of the aromatic trihydroxy phosphorus compounds of the present invention in a solvent. A distinct advantage of the aromatic trihydroxy phosphorus compounds of the present invention is that they may be mixed easily with the dihydric phenols and monohydric phenols employed to produce a tailor-made polycarbonate polymer characterized by the residue of the specific phenols employed. A preferred solvent is methylene chloride. As the mixture is continually agitated, the carbonyl halide, preferably phosgene, is added while maintaining the pH of at least 10, preferably at about 12–12.5, by the addition of an aqueous base preferably sodium hydroxide. The reaction is brought to completion by stopping the addition of phosgene and adding a catalyst, preferably triethylamine. After a short period of agitation, the agitation is stopped and the polycarbonate which is in the organic phase in the above-preferred procedure is separated from the aqueous phase. The polycarbonate is washed and recovered by steam precipitation or precipitation in a non-solvent, preferably n-heptane.

The preferred dihydric phenol of the present invention is bisphenol-A which has the following formula:

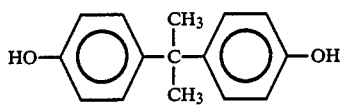

However, any of the dihydric phenols employed as reactants in the formation of polycarbonates may be used. The dihydric phenols employed in the practice of this invention are dihydric phenols in which the sole reaction groups are the two phenolic hydroxyl groups. Such dihydric phenols are represented by the general formula

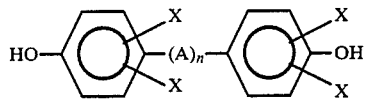

wherein
A is a divalent hydrocarbon radical containing 1–15 carbon atoms, or the following divalent radicals:
—S—, —S—S—,

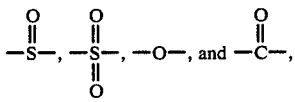

and
X is independently hydrogen, chlorine, bromine, fluorine, or a monovalent hydrocarbon radical such as an alkyl group of 1–4 carbons, an aryl group of 6–8 carbons such as phenyl, tolyl, xylyl, and oxyalkyl group of 1–4 carbons and an oxyaryl group of 6–8 carbons and n is 0 or 1.

One group of suitable dihydric phenols are those illustrated below:
1,1-bis(4-hydroxyphenyl)-1phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)pentane
2,2-bis(3,5-difluoro-4-hydroxyphenyl)butane
2,2-bis(4-hydroxyphenyl)propane (bisphenol-A)
1,1-bis(3-methyl-4-hydroxyphenyl)ethane Another group of dihydric phenols useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide Another group of dihyric phenols which may be used in the practice of the invention includes the dihydroxaryl sulfones such as, for example:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dibromo-4-hydroxyphenyl)sulfone
bis(3-methyl-4-hydroxyphenyl)sulfone
bis(4-hydroxyphenyl)sulfone Another group of dihydric phenols useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether A further group of dihydric phenols outside the scope of the above generic formula which may be used in the practice of the invention includes the dihydroxy benzenes, and the halo- and alkyl-substituted dihydroxy benzenes, such as, for example, resorcinol; hydroquinone; 1,4-dihydroxy-2-chlorobenzene; 1,4-dihydroxy-2-bromobenzene; 1,4-dihydroxy-2,3-dichlorobenzene; 1,4-dihydroxy-2-methylbenzene; 1,4-dihydroxy-2,3-dimethylbenzene; 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038, 3,036,039.

It is, of course, possible to employ a mixture of two or more different dihydric phenols in preparing the thermoplastic carbonate polymers of the invention.

Preferably employed in the production of the polycarbonate of the present invention is a monohydric phenol as a chain stopper or as a means to control molecular weight. Any suitable monohydric phenol may be used to prepare the polycarbonate of this invention. Some such suitable compounds include, for example, phenol, lower alkyl phenols such as, for example, 4-methylphenol, 3-ethylphenol, 5-propylphenol, 4-isopropylphenol, 5-butylphenol, 3-isobutylphenol, 4-tertiary butylphenol, 4-pentylphenol and the like; aryl phenols such as, for example, 4-phenyl phenol, 5-phenyl phenol and the like; cycloaliphatic phenols such as for example, 4-cyclohexyl phenol, 3-cyclopentyl phenol and the like; monophenol alkanes such as, for example, 2,2-(4-hydroxyphenyl-4-methoxyphenyl) propane; 3-hydroxyphenyl ethane, as well as any of those referred to hereinbefore or hereinafter.

The preferred method for producing the compositions of the present invention is by an interfacial polycondensation employing a carbonyl halide, preferably phosgene.

When using phosgene in producing polycarbonates, catalysts may also be advantageous. Such catalysts are, for example, tertiary or quaternary organic bases or salts thereof such as, trimethylamine, triethylamine, dimethylaniline, diethylaniline, dimethylcyclohexylamine, and pyridine, or for instance, the corresponding hydrochlorides and tetramethylammonium hydroxide, triethyloctadecyl ammonium chloride, trimethylbenzylammonium fluoride, triethylbenzylammonium chloride, dimethyldodecyl ammonium chloride, dimethylbenzyl phenyl ammonium chloride, trimethylcyclohexyl ammonium bromide, and N-methylpyrodonium chloride in amounts of from about 0.002 to about 0.5% by weight. These compounds may be added to the reaction mixture before or during the reaction.

In the preferred method, the reaction of dihydric phenols such as bisphenol-A with phosgene in the presence of the aromatic trihydroxy phosphorus compound of the present invention and monohydric phenols may be carried out at room temperature or at lower or elevated temperatures, that is to say, at temperatures of from the freezing point up to about the boiling point of the mixture and preferably from about 0° C. to about 100° C. The reaction conditions should be such that about one mol of phosgene reacts with about one mol of the dihydric phenol.

According to the present invention, the aromatic trihydroxy phosphorus compound may be employed in amounts ranging within 0.05 mol % to about 0.5 mol % relative to the dihydric phenol to obtain the random branching. At levels of from about 0.2 to 0.5 mol % of the aromatic trihydroxy phosphorus compound, it has been found that the polycarbonate exhibits high-melt tension and good shear sensitivity. When employing, based on the dihydric phenol, about 0.1 mol % to about 8 mol % of a monohydric phenol and about 0.3 mol % to 0.4 mol % of the aromatic trihydroxy phosphorous compound, the product is a thermoplastic randomly branched polycarbonate resin, especially suitable as a blow-molding resin for films and molded products.

The present invention is further illustrated by the following specific example of a preferred composition of the present invention which produced a resin exhibiting the high-melt tension and good shear sensitivity required in a blow-molding resin.

EXAMPLE I 1000 ml distilled water, 275 g. bisphenol-A, 3.8 g phenol, 1.1 g tri-(p-hydroxyphenyl) phosphine, and 1000 ml methylene chloride, are charged to a 5-l reactor equipped with agitator, reflux condenser, phosgene inlet tube, caustic addition tube, and pH electrode. The mixture is vigorously agitated, and phosgene is added at the rate of about 5 g per minute for about 32 minutes. During phosgene addition, pH is maintained at about 12–12.5. The pH is controlled by addition of an aqueous solution of 50% (by weight) sodium hydroxide. After phosgenation 1.0 ml triethylamine is added.

The agitation is stopped and the polycarbonate/methylene chloride solution is separated from the aqueous phase, washed and recovered by steam precipitation or precipitation in a nonsolvent such as n-heptane.

The polycarbonate recovered had a weight-average molecular weight of 33,600 and a number average molecular weight of 12,900 as measured by Gel Permeation Chromatography in tetrahydrofuran at 25° C.

Instron melt rheology measurements at 280° C. showed the polymer had melt viscosity of about 25,000 poises at a shear rate of 15 reciprocal seconds and 17,000 poises at 150 reciprocal seconds, demonstrating non-Newtonian flow behavior and good melt strength.

While the invention has been described herein with reference to certain specific materials, procedures and examples, it is understood that the invention is not restricted to the particular materials, combination of materials and procedures selected for the purposes of illustration. Numerous variations of such details can be employed by those skilled in the art within the scope of this invention which is defined by the appended claims.

I claim:

1. A composition of matter which comprises the polycarbonate reaction product produced under polycarbonate forming conditions by the reaction of
   (1) a carbonyl halide,
   (2) a dihydric phenol, and
   (3) an aromatic trihydroxy phosphorus compound selected from the following formulae:

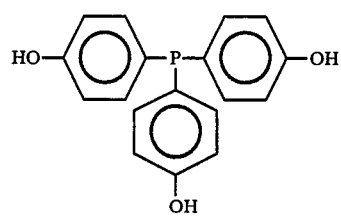

(1)

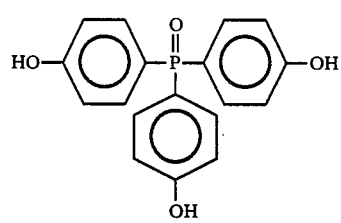

(2)

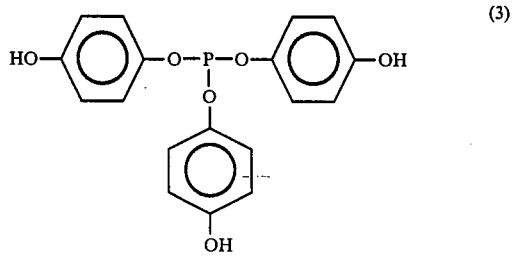

(3)

-continued

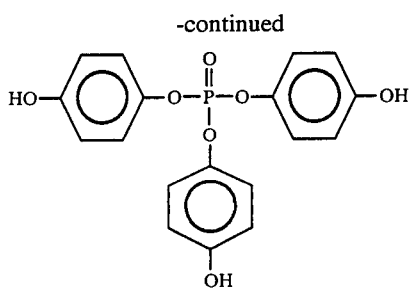
(4)

wherein the aromatic ring,

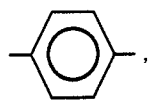

is

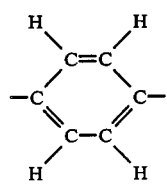

or the hydrogen substituted with a $C_1$ to $C_4$ alkyl, Cl, Br or a mixture thereof and wherein said phosphorus compound is present in amounts ranging within 0.05 mol% to about 0.5 mol% relative to said dihydric phenol to obtain random branching in said polycarbonate reaction product.

2. A composition of matter according to claim 1 wherein said dihydric phenol is bisphenol-A.

3. A composition of matter according to claim 1 wherein said phosphorus compound is tri(p-hydroxyphenyl)phosphine.

4. A composition of matter according to claim 1 wherein said carbonyl halide is phosgene.

5. A composition of matter according to claim 1 which further includes as a reactant (4) a monohydric phenol.

6. A composition of matter according to claim 5 wherein said monohydric phenol is t-butyl phenol.

7. A composition of matter according to claim 1 wherein said phosphorus compound is present in amounts ranging within 0.2 mol % to about 0.5 mol % relative to said dihydric phenol.

8. A composition of matter according to claim 5 wherein said monohydric phenol is present in amounts ranging within 0.1 mol % to about 8 mol % and said phosphorus compound is present in amounts ranging within 0.3 mol % to about 0.4 mol %, relative to said dihydric phenol.

9. A polycarbonate composition produced by an interfacial polycondensation of a carbonyl halide, a dihydric phenol and an aromatic trihydroxy phosphorus compound in which 0.05 mol% to about 0.5 mol% relative to the dihydric phenol is an aromatic trihydroxy phosphorus compound selected from the following formulae to induce random-chain branching:

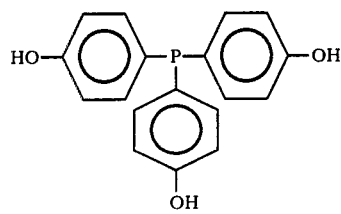
(1)

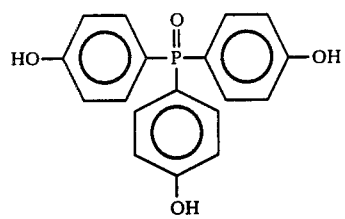
(2)

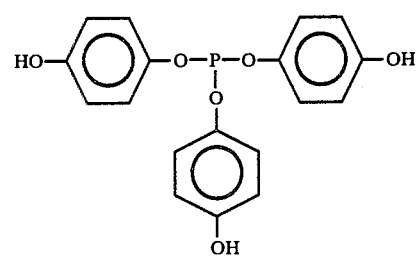
(3)

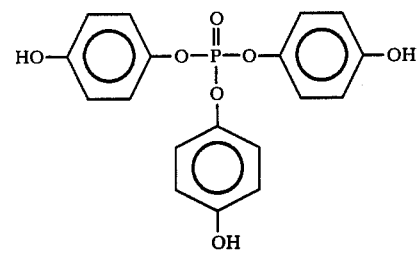
(4)

wherein the aromatic ring,

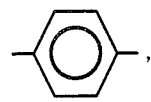

is

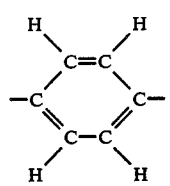

or the hydrogen substituted with a $C_1$ to $C_4$ alkyl, Cl, Br or a mixture thereof.

10. The composition of claim 9 wherein said dihydric phenol is a bisphenol-A.

11. The composition of claim 9 wherein said phosphorus compound is tri(p-hydroxyphenyl)phosphine.

12. A method for preparing a polycarbonate composition having random-chain branching by reacting
(1) a carbonyl halide,
(2) a dihydric phenol, and (3) an aromatic trihydroxy phosphorus compound selected from the following formulae:
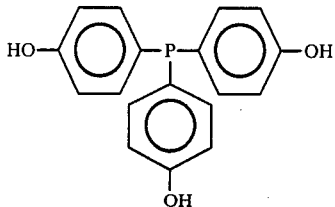
(1)
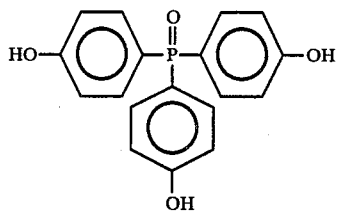
(2)
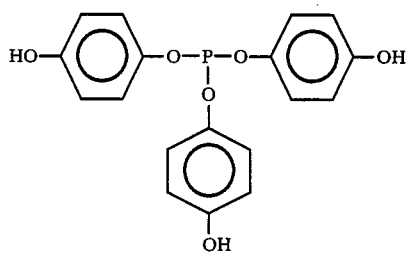
(3)
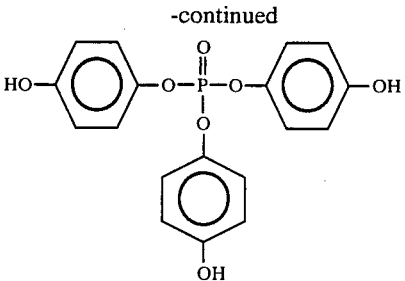
(4)
wherein the aromatic ring,
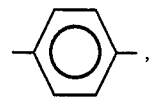
is
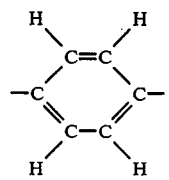
or the hydrogen substituted with a $C_1$ to $C_4$ alkyl, Cl, Br or a mixture thereof.
13. A method according to claim 12 wherein said dihydric phenol is bisphenol-A.
14. A method according to claim 13 wherein said carbonyl halide is phosgene.
* * * * *